US010469361B1

(12) United States Patent
Bayross et al.

(10) Patent No.: US 10,469,361 B1
(45) Date of Patent: Nov. 5, 2019

(54) LOOP PREVENTION FOR EVPN AND PBB-EVPN

(71) Applicant: Juniper Networks, Inc., Sunnyvale, CA (US)

(72) Inventors: Candida M. Bayross, Santa Clara, CA (US); SelvaKumar Sivaraj, Sunnyvale, CA (US); Tapraj Singh, San Ramon, CA (US); Sunesh Rustagi, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 165 days.

(21) Appl. No.: 15/270,527

(22) Filed: Sep. 20, 2016

(51) Int. Cl.
*H04L 12/705* (2013.01)
*H04L 12/46* (2006.01)
*H04L 12/721* (2013.01)
*H04L 12/741* (2013.01)

(52) U.S. Cl.
CPC .......... *H04L 45/18* (2013.01); *H04L 12/4633* (2013.01); *H04L 12/4641* (2013.01); *H04L 45/66* (2013.01); *H04L 45/745* (2013.01)

(58) Field of Classification Search
CPC ........................... H04L 12/4625; H04L 12/28
See application file for complete search history.

(56) References Cited

U.S. PATENT DOCUMENTS 7,463,597 B1 * 12/2008 Kompella ............. H04L 12/462
370/256
8,467,316 B1 * 6/2013 Goli ..................... H04L 12/4625
370/254
8,601,133 B1 * 12/2013 Rainovic ............. H04L 12/4633
709/227
2013/0163596 A1 * 6/2013 Zhang ..................... H04L 45/18
370/392
2018/0026810 A1 * 1/2018 Manthiramoorthy ... H04L 43/08
370/249

OTHER PUBLICATIONS

Sajassi et al., "BGP MPLS-Based Ethernet VPN," RFC 7432, Internet Engineering Task Force (IETF), Feb. 2015, 56 pp.
Sajassi et al., "Provider Backbone Bridging Combined with Ethernet VPN (PBB-EVPN)," RFC 7623, Internet Engineering Task Force (IETF), Sep. 2015, 23 pp.
Rosen et al., "BGP/MPLS IP Virtual Private Networks (VPNs)," RFC 4364, Network Working Group, Feb. 2006, 47 pp.

* cited by examiner

*Primary Examiner* — Redentor Pasia
(74) *Attorney, Agent, or Firm* — Shumaker & Sieffert, P.A.

(57) ABSTRACT

In general, techniques are described for reducing forwarding loops for layer (L2) traffic that traverses an EVPN or PBB-EVPN instance (EVI) by deterministically determining an access-facing logical interface to block from respective access-facing logical interfaces of PE devices that switch the L2 traffic using the EVI. A provider edge (PE) network device may detect an L2 forwarding loop on an L2 forwarding path that includes the access-facing logical interface. In response to detecting an L2 forwarding loop and based at least on comparing an identifier for the local PE device and an identifier for a remote PE device that implements the EVPN instance, the PE device may block the access-facing logical interface to block L2 traffic from the local customer network.

17 Claims, 4 Drawing Sheets

LOOP PREVENTION FOR EVPN AND PBB-EVPN

TECHNICAL FIELD

The invention relates to computer networks and, more specifically, to forwarding packets within computer networks.

BACKGROUND

A computer network is a collection of interconnected computing devices that can exchange data and share resources. Example network devices include switches or other layer two devices that operate within the second layer (L2) of the Open Systems Interconnection (OSI) reference model, i.e., the data link layer, and routers or other layer three (L3) devices that operate within the third layer of the OSI reference model, i.e., the network layer. Network devices within computer networks often include a control unit that provides control plane functionality for the network device and forwarding components for routing or switching data units.

An Ethernet Virtual Private Network (EVPN) may be used to extend two or more remote layer two (L2) customer networks through an intermediate layer three (L3) network (usually referred to as a provider network), in a transparent manner, i.e., as if the intermediate L3 network does not exist. In particular, the EVPN transports L2 communications, such as Ethernet packets or "frames," between customer networks via traffic engineered label switched paths (LSP) through the intermediate network in accordance with one or more multiprotocol label switching (MPLS) protocols. In a typical configuration, provider edge (PE) devices (e.g., routers and/or switches) coupled to the customer edge (CE) network devices of the customer networks define label switched paths (LSPs) within the provider network to carry encapsulated L2 communications as if these customer networks were directly attached to the same local area network (LAN). In some configurations, the PE devices may also be connected by an IP infrastructure in which case IP/GRE tunneling or other IP tunneling can be used between the network devices.

In an EVPN, L2 address learning (also referred to as "MAC learning") on a core-facing interface of a PE device occurs in the control plane rather than in the data plane (as happens with traditional bridging) using a routing protocol. For example, in EVPNs, a PE device typically uses the Border Gateway Protocol (BGP) (i.e., an L3 routing protocol) to advertise to other provider edge network devices the MAC addresses the PE device has learned from the local consumer edge network devices to which the PE device is connected. As one example, a PE device may use a BGP route advertisement message to announce reachability information for the EVPN, where the BGP route advertisement specifies one or more MAC addresses learned by the PE device instead of L3 routing information. Additional example information with respect to EVPN is described in "BGP MPLS-Based Ethernet VPN," Request for Comments (RFC) 7432, Internet Engineering Task Force (IETF), February, 2015, the entire contents of which are incorporated herein by reference.

A Provider Backbone Bridged Ethernet Virtual Private Network (PBB-EVPN) combines EVPN services with MAC-in-MAC encapsulation when transporting L2 communications. That is, a customer frame transported through the PBB-EVPN has MAC-in-MAC encapsulation in which customer MAC (C-MAC) addresses within the header are encapsulated within backbone MAC (B-MAC) addresses, thereby maintaining separation between the provider L2 domain and the customer L2 domain. In PBB-EVPN, PEs distribute reachability information for B-MAC addresses associated with local Ethernet segments using EVPN route advertisements, and remote PEs receive encapsulated customer frames and learn, via the data plane, the C-MAC addresses in association with the remote B-MACs for traffic. Additional example information with respect to PBB-EVPN is described in "Provider Backbone Bridging Combined with Ethernet VPN (PBB-EVPN)," Request for Comments (RFC) 7623, Internet Engineering Task Force (IETF), September, 2015, the entire contents of which are incorporated herein by reference.

SUMMARY

In general, techniques are described for reducing forwarding loops for layer (L2) traffic that traverses an EVPN or PBB-EVPN instance (EVI) by deterministically determining an access-facing logical interface to block from respective access-facing logical interfaces of PE devices that switch the L2 traffic using the EVI. For example, multiple PE devices of a layer 3 (L3) network may be configured to provide an EVI for L2 virtual bridge connectivity across the L3 network among customer networks attached to the PE devices. A local PE device that serves a local Ethernet segment for the EVI may have an access-facing interface (or "attachment circuit") configured for exchanging L2 traffic with devices of the local Ethernet segment. The local PE device may also have a core-facing interface configured for exchanging L2 traffic with remote PE devices for the EVI. The local PE device may receive an identifier for a remote PE device, such as a loopback Internet Protocol (IP) address or a backbone MAC (B-MAC) address associated with an Ethernet segment for the EVI and served by the remote PE device.

In response to detecting an L2 forwarding loop in a forwarding path that includes the access-facing interface and the core-facing interface, the local PE device may compare the identifier for the remote PE device for the core-facing interface with an identifier for the local PE device. Based on the comparison, the local PE device may block the access-facing interface to block looped L2 traffic from the EVI. Because the remote PE device may perform a substantially similar operation to compare the identifier for the local PE device and the identifier for the remote PE device, the remote PE device may determine to keep the access-facing interface for the remote PE device active (i.e., not blocked).

In some cases, the identifiers for PE devices on which the comparison is based are IP or B-MAC addresses of the PE devices. For example, in an EVPN, the local PE device may determine a lower one of respective loopback addresses of the local and remote PE devices. In a PBB-EVPN, the local PE device may determine a lower one of respective B-MAC addresses of core-facing interfaces of the local and remote PE devices. The local PE device may block its access-facing logical interface in response to determining the local PE device is associated with the lower identifier.

In this way, the techniques described in this disclosure enable PE devices in an EVPN or PBB-EVPN to deterministically determine whether to block logical ports for the EVI to ensure that packets are not forwarded back toward a customer network across the core via the EVI. Because each PE device of the EVI independently determines whether to block its access-facing logical interface without exchanging communication, the techniques may reduce overhead for customers in identifying/tracking looped logical ports and blocking logical ports to eliminate loops. In addition, by simply manipulating the identifiers for the PE devices in an EVI, a customer may pre-determine access-facing interface blocking priority among the various PE devices to facilitate customer goals for L2 traffic delivery.

In one example, a method includes detecting, by a local provider edge (PE) device that implements an Ethernet Virtual Private Network (EVPN) instance to provide layer 2 (L2) bridge connectivity for a local customer network using an access-facing logical interface, an L2 forwarding loop on an L2 forwarding path that includes the access-facing logical interface; and blocking, by the local PE device in response to the detecting and based at least on comparing an identifier for the local PE device and an identifier for a remote PE device that implements the EVPN instance and is logically located on the L2 forwarding path, the access-facing logical interface to block L2 traffic from the local customer network.

In another example, a network device includes one or more processors operably coupled to a memory, a routing engine configured for execution by the one or more processors to implement an Ethernet Virtual Private Network (EVPN) instance to provide layer 2 (L2) bridge connectivity for a local customer network using an access-facing logical interface; a loop detection module configured for execution by the one or more processors to detect an L2 forwarding loop on an L2 forwarding path that includes the access-facing logical interface; and a blocking module configured for execution by the one or more processors to block, based at least on comparing an identifier for the network device and an identifier for a remote network device that implements the EVPN instance and is logically located on the L2 forwarding path, the access-facing logical interface to block L2 traffic from the local customer network.

In another example, a system includes a local provider edge (PE) device of an intermediate layer 3 network, the local PE device configured to implement an Ethernet Virtual Private Network (EVPN) instance that is configured on the local PE device to provide layer 2 (L2) bridge connectivity to a local customer network via an access-facing logical interface of the local PE device; a remote PE device of the intermediate layer 3 network, the remote PE device configured to implement the EVPN instance that is configured on the remote PE device to provide layer 2 (L2) bridge connectivity for a remote customer network via an access-facing interface of the remote PE device, wherein the local PE device is configured to detect an L2 forwarding loop on an L2 forwarding path that includes the access-facing interface of the local PE device and to block, in response to the detection and based at least on comparing an identifier for the local PE device and an identifier for the remote PE device, the access-facing interface of the local PE device to block L2 traffic from the local customer network, and wherein the remote PE device is configured to detect the L2 forwarding loop and to not block, in response to the detection and based at least on comparing the identifier for the local PE device and the identifier for the remote PE device, the access-facing interface of the remote PE device to continue forwarding L2 traffic from the remote customer network.

The details of one or more embodiments are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
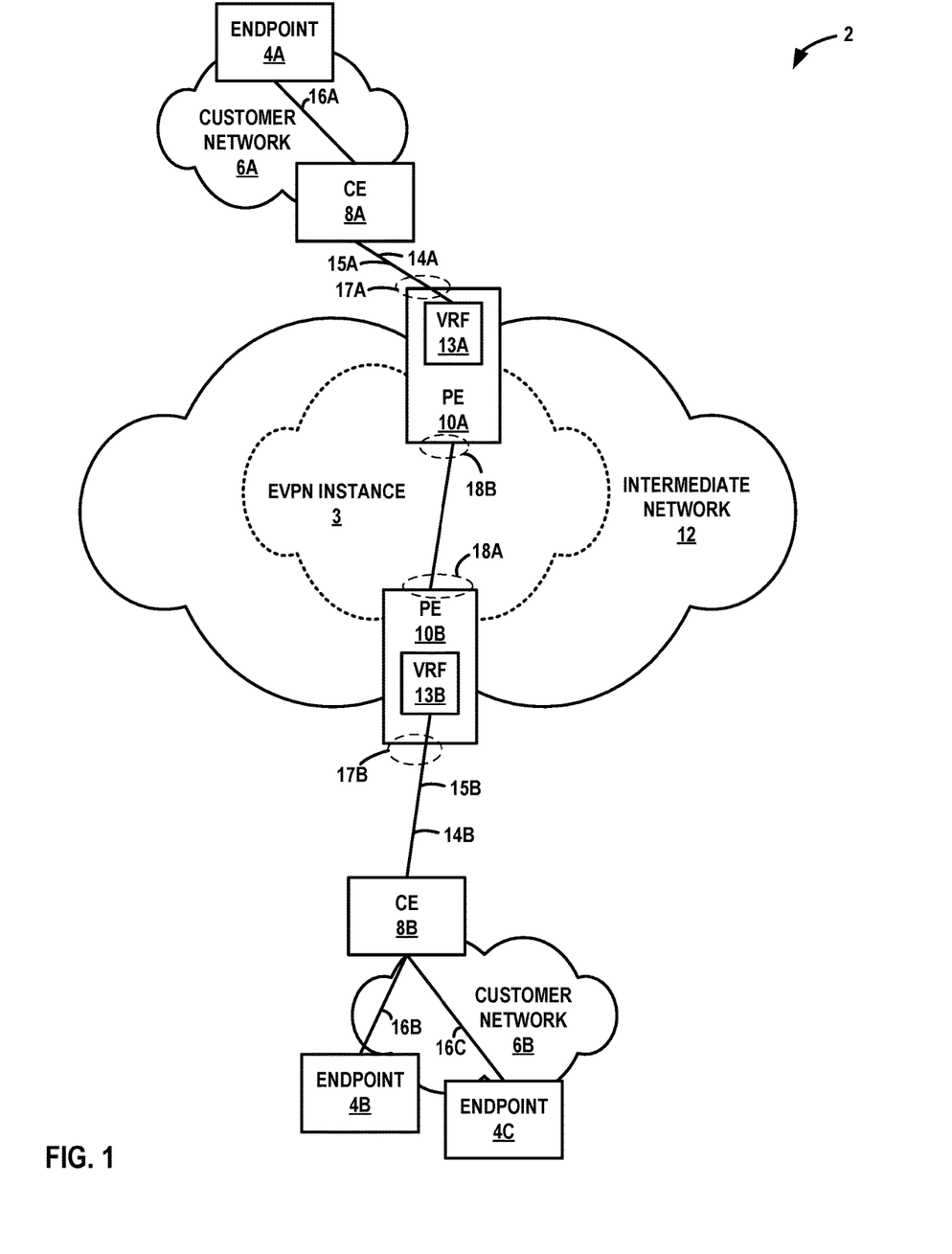
FIG. 1 is a block diagram illustrating an example network system in which provider edge network devices within an Ethernet Virtual Private Network (EVPN) deterministically determine an access-facing logical interface to block for loop avoidance, according to techniques described herein.

FIG. 1 is a block diagram illustrating an example network system 2 in which provider edge (PE) network devices within an Ethernet Virtual Private Network (EVPN) deterministically determine an access-facing logical interface to block for loop avoidance, according to techniques described herein. In the example of FIG. 1, provider edge (PE) devices 10A, 10B ("PEs 10") provide customer endpoints 4A-4C ("endpoints 4") associated with customer networks 6A, 6B ("customer networks 6") with access to an intermediate layer 3 (L3) network 12 ("intermediate network 12") via customer edge (CE) devices 8A, 8B ("CEs 8"). PEs 10 may represent other types of PE devices capable of performing PE operations for an Ethernet Virtual Private Network (EVPN).

PEs 10 and CEs 8 may each represent a router, switch, or other suitable network devices that participates in a layer two (L2) virtual private network (VPN) (L2VPN) service, such as an EVPN. Customer networks 6 may be networks for geographically or logically separated sites of an enterprise or may represent networks for different customers of the intermediate network 12 (or tenants of a data center intermediate network). Each of endpoints 4 may represent one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. The configuration of network 2 illustrated in FIG. 1 is merely an example. For example, an enterprise may include any number of customer networks 6. Nonetheless, for ease of description, only customer networks 6A, 6B are illustrated in FIG. 1.

Intermediate network 12 may represent a service provider network that is owned and operated by a service provider, which is usually large telecommunications entity or corporation. Intermediate network 12 represents an L3 computer network, where reference to a layer followed by a number refers to a corresponding layer in the Open Systems Interconnection (OSI) model. Intermediate network 12 is a L3 network in the sense that it natively supports L3 operations as described in the OSI model. Common L3 operations include those performed in accordance with L3 protocols, such as the Internet protocol (IP). L3 is also known as a "network layer" in the OSI model and the "IP layer" in the TCP/IP model, and the term L3 may be used interchangeably with the and "network layer" and "IP" throughout this disclosure.

Although not illustrated, intermediate network 12 may be coupled to one or more networks administered by other providers, and may thus form part of a large-scale public network infrastructure, e.g., the Internet. Consequently, customer networks 6 may be viewed as edge networks of the Internet where the intermediate network is a service provider network. Intermediate network 12 may provide computing devices within customer networks 6 with access to the Internet, and may allow the computing devices within the customer networks to communicate with each other. In some cases, intermediate network 12 represents a data center L2/L3 switching fabric (or "data center fabric network") that interconnects CEs for tenants of the data center, where a tenant may represent an organization or a logical partitioning of resources, data, and/or applications within the data center.

Although additional network devices are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of system 2 are illustrated as being directly coupled, it should be understood that one or more additional network elements may be included along any of the illustrated links 15A, 15B, 16A, 16B, and 16C, such that the network elements of system 2 are not directly coupled.

Intermediate network 12 may provide a number of residential and business services, including residential and business class data services (which are often referred to as "Internet services" in that these data services permit access to the collection of publically accessible networks referred to as the Internet), residential and business class telephone and/or voice services, and residential and business class television services. One such business class data service offered by a service provider intermediate network 12 includes L2 EVPN service. Intermediate network 12 that represents an L2/L3 switch fabric for one or more data centers may implement an L2 EVPN service. An EVPN is a service that provides a form of L2 connectivity across an intermediate L3 network, such as intermediate network 12, to interconnect two or more L2 customer networks, such as L2 customer networks 6, that may be located in different geographical areas (in the case of service provider network implementation) and/or in different racks (in the case of a data center implementation). Often, EVPN is transparent to the customer networks in that these customer networks are not aware of the intervening intermediate network and instead act and operate as if these customer networks were directly connected and form a single L2 network. In a way, EVPN enables a form of a transparent LAN connection between two customer sites that each operates an L2 network and, for this reason, EVPN may also be referred to as a "transparent LAN service."

To configure an EVPN, a network operator of the intermediate network 12 configures, via configuration or management interfaces, various devices included within intermediate network 12 that interface with L2 customer networks 6. The EVPN configuration may include an EVPN instance (EVI), which comprises of one or more broadcast domains. Generally, an EVI may be associated with a virtual routing and forwarding instance (VRF), e.g., VRFs 13A, 13B ("VRFs 13"), on a PE device, such as any of PEs 10A, 10B. Consequently, multiple EVIs may be configured on PEs 10 for Ethernet segments 14A-14B ("Ethernet segments 14"), each providing a separate, logical layer two (L2) or layer three (L3) forwarding domain. In this way, multiple EVIs may be configured that each includes one or more of PEs 10. In some examples, Ethernet Tags are then used to identify a particular broadcast domain, e.g., a VLAN, in an EVI. A PE device may advertise an MPLS service label (or "MAC label," "MAC route label," or more simply "label") per-<ESI, Ethernet Tag> combination. This label assignment methodology is referred to as a per-<ESI, Ethernet Tag> label assignment. Alternatively, a PE device may advertise a unique label per MAC address. In still another example, a PE device may advertise the same single label for all MAC addresses in a given EVI. This label assignment methodology is referred to as a per-EVI label assignment. Such labels are advertised by PEs 10 in EVPN MAC advertisement routes.

In the example of FIG. 1, an EVPN instance (EVI) 3 is configured within intermediate network 12 for customer networks 6 to enable customer networks 6 to communicate with one another via EVPN as if customer networks 6 were directly connected via an L2 network. In this example, EVI 3 spans PE devices 10A, 10B participating in the EVI 3. Each of PEs 10 is configured with EVI 3 and exchanges EVPN routes to implement EVI 3.

For example, in typical operation, PEs 10 communicate using the Border Gateway Protocol (BGP) to transport BGP Network Layer Reachability Information (NLRI) for the EVPN and may define different EVPN route types for conveying EVPN information via the BGP routing protocol. The EVPN NLRI is typically carried in BGP using BGP Multiprotocol Extensions. An Ethernet segment route advertised by each of PEs 10 using BGP includes a Route Distinguisher and Ethernet Segment Identifier. An Ethernet AD route advertised by each PE devices 6 for each EVI, specifies a Route Distinguisher (RD) (which may include, e.g., an IP address of the PE), ESI, Ethernet Tag Identifier, and MPLS label. Subsequent BGP media access control (MAC) routes output by PEs 10 announce MAC addresses of endpoints 4 for the EVPN and include a RD, ESI, Ethernet Tag Identifier, MAC address and MAC address length, IP address and IP address length, and MPLS label.

In the example of FIG. 1, when providing the EVPN service to customer networks 6, PEs 10 and CEs 8 perform MAC address learning to efficiently forward L2 network communications in system 2. That is, as PEs 10 and CEs 8 forward Ethernet frames, the routers learn L2 state information for the L2 network, including MAC addressing information on access-facing logical interfaces 17A, 17B ("access-facing logical interfaces 17") and core-facing logical interfaces 18A, 18B ("core-facing logical interfaces 18"). Access-facing logical interfaces 17 are customer edge-facing attachment circuits of PEs 10 that are connected to CEs 8 to process customer frames or packets at Layer 2 or above. Access-facing logical interfaces 17 process customer frames or packets at Layer 2 or above for CEs 8 in named VRFs 13 belonging to EVI 3. Core-facing logical interfaces 18 for EVI 3 provide interfaces for transmitting to or receiving from a tunnel (e.g., GRE IPv4) connecting to other PE devices belonging to EVI 3 of intermediate network 12.

PEs 10 and CEs 8 typically store the MAC addressing information in MAC tables associated with respective interfaces, such as access-facing logical interfaces 17 and core-facing logical interfaces 18. When forwarding an individual Ethernet frame received on one interface, a router typically broadcasts the Ethernet frame to all other interfaces associated with the EVPN unless the router has previously learned the specific interface through which the destination MAC address specified in the Ethernet frame is reachable. In this case, the router forwards a single copy of the Ethernet frame out the associated interface.

Moreover, as PEs 10 learn the source MAC address for endpoints 4 reachable through local access-facing logical interfaces 17, PEs 10 use MAC address route advertisements of a layer three (L3) routing protocol (e.g., BGP) to share the learned MAC addresses and to provide an indication that the MAC addresses are reachable through the particular PE device 10 that is issuing the route advertisement. In the EVPN implemented using PEs 10 for EVI 3, each of PEs 10 advertises the locally learned MAC addresses to other PEs 10 in intermediate network 12 using BGP route advertisements, also referred to herein as a "MAC route," "MAC Advertisement route," or "MAC Advertisement." The other PEs 10 may remotely learn the source MAC addresses on core-facing logical interfaces 18 associated with EVI 3. A MAC route typically specifies an individual MAC address of an endpoint 4 along with additional forwarding information, such as a route descriptor, route target, layer 2 segment identifier, MPLS label, etc. In this way, PE routers 10 use BGP to advertise and share the MAC addresses learned when forwarding layer two communications associated with the EVPN. Accordingly, PEs 10 may perform both local learning and remote learning of source MAC addresses.

Each of PEs 10 uses MAC routes specifying the MAC addresses learned by other PE devices to determine how to forward L2 communications to MAC addresses that belong to endpoints 4 connected to other PEs, i.e., to remote CEs and/or endpoints behind CEs operatively coupled to PE devices. That is, each of PEs 10 determines whether Ethernet frames can be sent directly to a particular one of the other PEs 10 or whether to treat the Ethernet frames as so called "BUM" traffic (Broadcast, Unidentified unicast or Multicast traffic) that is to be flooded within the EVPN based on the MAC addresses learning information received from the other PE devices.

As shown in FIG. 1, CE 8A is coupled to PEs 10A via link 15A. PE 10A may configure an EVPN instance, such as EVI 3, for Ethernet segment 14A to provide L2 communications between CE 8A and PE 10A. Thus, PE 10A is capable of providing access to EVPN for L2 customer network 6A via CE 8A. EVI 3 may operate over a Multi-Protocol Label Switching (MPLS) configured network and use MPLS labels to forward network traffic accordingly. MPLS is a mechanism used to engineer traffic patterns within Internet Protocol (IP) networks according to the routing information maintained by the routers in the networks. By utilizing MPLS protocols, such as the Label Distribution protocol (LDP) or the Resource Reservation Protocol with Traffic Engineering extensions (RSVP-TE), a source device can request a path through a network to a destination device, i.e., a Label Switched Path (LSP). An LSP defines a distinct path through the network to carry MPLS packets from the source device to a destination device. Using an MPLS protocol, each router along an LSP allocates a label and propagates the label to the closest upstream router along the path. Routers along the path add or remove the labels and perform other MPLS operations to forward the MPLS packets along the established path.

As shown in the example of FIG. 1, intermediate network 12 may provide an MPLS core or IP tunneling infrastructure for sending network packets from customer network 6A to and from customer network 6B. Each of PEs 10 implement the MPLS protocol and apply one or more MPLS labels, i.e., a label stack, to network packets in accordance with routing and forwarding information configured at each respective PE device.

As shown in FIG. 1, PEs 10 include respective VRFs 13A, 13B for EVI 3 that includes customer networks 6. Generally, VRFs permits multiple routing tables to exist within a single physical router. Access-facing logical interface 17A may be associated with VRF 13A, and VRF 13A may be configured to forward traffic for the attachment circuit for EVI 3. VRFs 13 may be configured to include functionality described in "BGP/MPLS IP Virtual Private Networks (VPNs)," February 2006, https://tools.ietf.org/html/rfc4364, which is hereby incorporated by reference herein in its entirety.

As noted above, PE 10A locally learns MAC addresses for customer endpoints 4 reachable via access-facing logical interface 17A. In some cases, PE devices may learn the IP addresses associated with respective MAC addresses in the control or management plane between the CEs 8 and the PEs 10. As used hereinafter, a "MAC/IP binding" refers to an association between a MAC address and an IP address for a customer endpoint 4. When PE 10A learns the MAC address of locally connected customer endpoint 4A, PE 10A may advertise the locally learned MAC address to other PE devices 10 by including it in a MAC Advertisement route. PE 10B may receive the MAC Advertisement route from a tunnel connecting to PE 10A belonging to EVI 3 of intermediate network 12. PE 10B may remotely learn MAC addresses for customer endpoint 4A via core-facing logical interface 18A.

In some examples, due to misconfiguration of any one or more of PEs 10, CEs 8; or due to duplicate L2 addresses for endpoint devices 4 behind different PEs 10; an L2 forwarding loop between PE 10B and CE 8B on Ethernet segment 14B may occur such that PE 10B receives packets having source MAC addresses that match the MAC address of endpoint 4A on both core-facing logical interface 18A and access-facing logical interface 17B. For instance, having already remotely learned the MAC address for endpoint 4A at core-facing logical interface 18A, PE 10B may subsequently learn the MAC address for endpoint 4A on access-facing logical interface 17B. This may occur because CE 8B hairpins at least one packet having a source MAC address that matches the MAC address of endpoint 4A due to a routing configuration or learned route or because another L2 device, e.g., endpoint 4B of Ethernet segment 14B, is configured with a same MAC address as endpoint 4A and sends at least one packet having the source MAC address that is the MAC address. In some situations, L2 forwarding loops may occur for reasons other than those listed above.

When a source MAC address, e.g., MAC address for endpoint 4A, is received on a different physical or logical interface of an L2 switching device such as PE device 10B, the L2 switching device performs a MAC address move or "MAC move." As a result of a MAC move for a MAC address from a previous interface to a new interface, the L2 switching device forwards L2 packets destined to the MAC address via the new interface. In the example of FIG. 1, due to the forwarding loop described above, the MAC address for endpoint 4A may move from core interface 18A to access-facing logical interface 17B and back as each of these interfaces alternate, in time, receiving packets having source MAC addresses that match the L2 address for endpoint 4A.

To detect L2 forwarding loops, PE 10B may configure a loop detection threshold based on the number of times a MAC address move occurs over time, a specified period of time over which the MAC address move occurs, or a specified number of times a MAC address move occurs, for instance. As one example, PE 10B may be configured with a loop detection threshold that indicates a L2 forwarding loop based on detecting 5 MAC address moves between different interfaces of PE 10B in a span of 30 seconds. Upon reaching the loop detection threshold, PE devices 10 may in some cases block a corresponding one of access-facing logical interfaces 17 to block L2 traffic from the local customer network. In the example of FIG. 1, upon the detection of L2 forwarding loop on Ethernet segment 14B, PE 10B may block access-facing logical interface 17B from receiving L2 traffic from local customer network 6B via CE 8B. That is, PE 10B will not forward L2 traffic received on blocked access-facing logical interface 17B.

In accordance with techniques of this disclosure, any of PE devices 10 may deterministically determine whether to block its access-facing logical interface for EVI 3 from forwarding L2 EVPN traffic from the local customer network based on a comparison of an identifier of a local PE device and an identifier for a remote PE device of EVI 3. As one example, an identifier may be a loopback IP address, e.g., a corresponding IP (IPv4/IPv6) address configured for each of PE devices 10. For example, in response to detecting an L2 forwarding loop on an L2 forwarding path that includes core-facing interface 18A and access facing interface 17B of PE 10B for EVI 3, PE 10B may compare a local loopback IP address of PE 10B with a remote loopback IP address of PE 10A and, based on the comparison, PE 10B may block (or not block) access-facing logical interface 17B. In some examples, if the local loopback IP address of PE 10B is lower than the remote loopback IP address of PE 10A, PE 10B may block access-facing logical interface 17B to block L2 traffic from customer network 6B. In this way, a forwarding loop between PE 10B and CE 8B is avoided for subsequent L2 traffic. PE 10B may obtain the remote loopback IP address of PE 10A in an EVPN MAC/IP advertisement route (EVPN Route Type 2), where the PE 10A originates the EVPN MAC/IP advertisement route by which the PE 10B learns a MAC address on core-facing interface 18A. The MAC address may be the L2 address for which PE 10B has identified the L2 forwarding loop. The identifier for PE 10A may be included in an ORIGIN attribute of a BGP UPDATE message for the EVPN MAC/IP advertisement route, for instance.

PE 10A may also detect the L2 forwarding loop detected by PE 10B and perform the operation described above to determine whether to block access-facing logical interface 17A for EVI 3. For example, PE 10B may forward L2 traffic to PE 10A of EVI 3 that is logically located on the L2 forwarding path. Having already learned the MAC address for endpoint 4A at access-facing logical interface 17A, PE 10A may subsequently learn the MAC address of endpoint 4A on core-facing logical interface 18B, e.g., via an EVPN MAC/IP advertisement route originated by PE 10B. As described above, because MAC address information for endpoint 4A appears on a different interface of PE 10A, the MAC address moves from access-facing logical interface 17A to core-facing logical interface 18B and back as each of these interfaces alternate, in time, receiving packets having source MAC addresses that match the L2 address for endpoint 4A. In response to detecting an L2 forwarding loop, PE 10A may compare a local loopback IP address for PE 10A with a remote loopback IP address of PE 10B learned at core-facing logical interface 18B of EVI 3 that is logically located on the L2 forwarding path, and, based on the comparison, PE 10A may block (or not block) access-facing logical interface 17A. If the remote loopback IP address of PE 10A is lower than the local loopback IP address of PE 10B, then PE 10A may block access-facing logical interface 17A of PE 10A to block L2 traffic from customer network 6A.

Because PE 10A and 10B have different identifiers that serve as the basis for the determination to block an access interface for EVI 3 in response to detecting an L2 forwarding loop, and because PE 10A and 10B use each other's identifier as the remote identifier, the same operation performed by PE 10A and 10B will cause each of the PEs to determine a different result. That is, only one of PEs 10A, 10B will determine to block its associated access-facing logical interface 17 for EVI 3 (and will block the interface), and one of PEs 10A, 10B will determine not to block its associated access-facing logical interface 17 for EVI 3 (and will not block the interface). In this way, PE devices 10 may deterministically determine which access-facing logical interface 17 to block in order to eliminate an L2 forwarding loop in the EVI, while leaving the other access-facing logical interface 17. The respective determinations by PEs 10 may be independently performed without the PEs 10 exchanging communications to determine which of access-facing logical interfaces 17 is to be blocked.

The techniques may thus reduce overhead for customers in identifying/tracking looped logical ports and blocking logical ports to eliminate loops. In addition, by simply manipulating the identifiers for the PEs 10 in an EVI 3, a customer may pre-determine which of access-facing logical interfaces 17 has blocking priority to facilitate customer goals for L2 traffic delivery.

Figure 2:
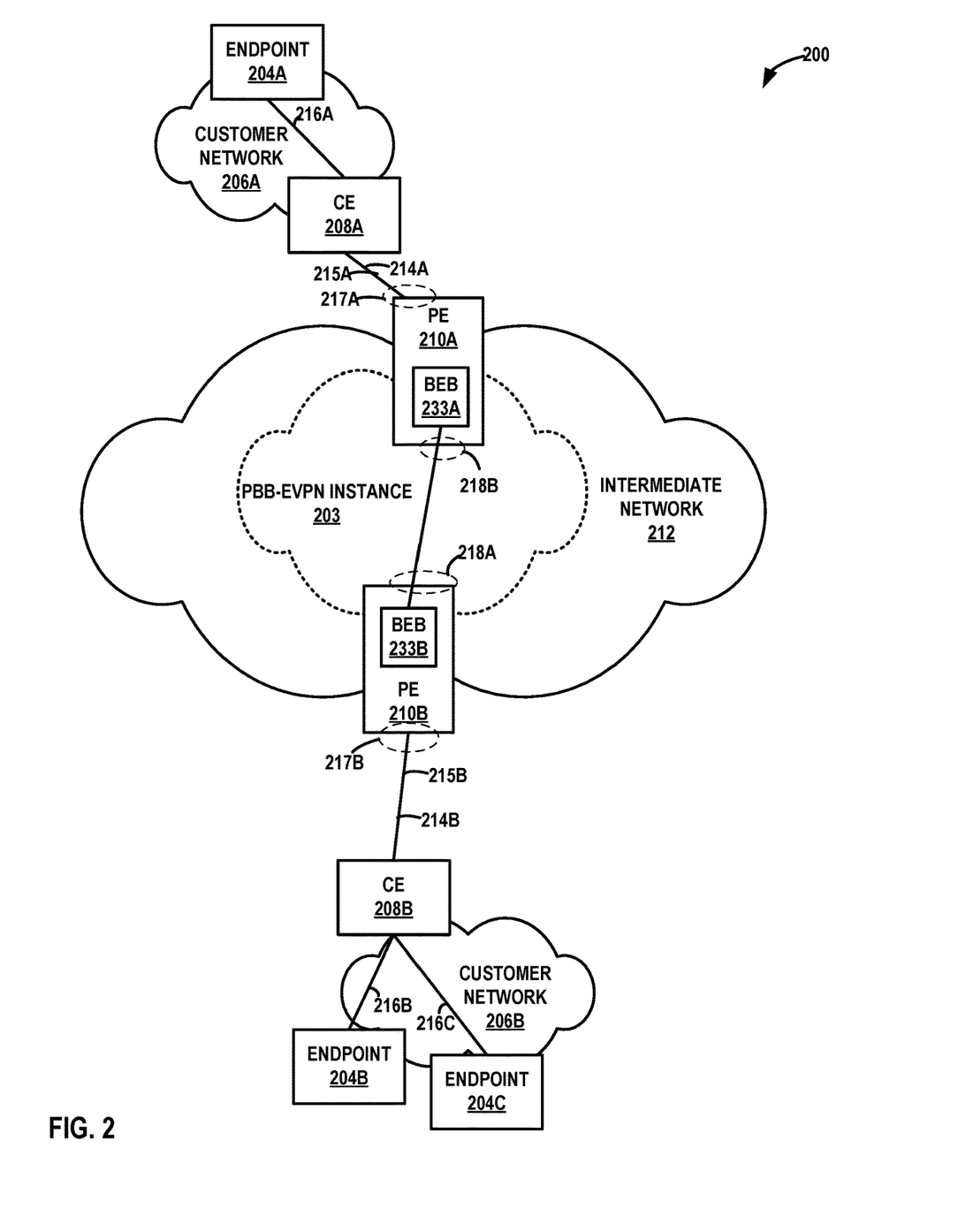
FIG. 2 is a block diagram illustrating an example network system in which provider edge network devices within a Provider Backbone Bridged Ethernet Virtual Private Network (PBB-EVPN) deterministically determine an access-facing logical interface to block for loop avoidance, according to techniques described herein.

FIG. 2 is a block diagram illustrating an example network system 200 in which provider edge (PE) devices within a Provider Backbone Bridged Ethernet Virtual Private Network (PBB-EVPN) deterministically determine an access-facing logical interface to block for loop avoidance, according to techniques described herein. Network system 200 of FIG. 2 is similar to the network system 2 of FIG. 1 except as described below.

In the example of FIG. 2, provider edge devices 210A, 210B ("PEs 210") are coupled to customer edge devices 208A, 208B ("CEs 208") by respective Ethernet links 215A, 215B that constitutes Ethernet segments 214A, 214B ("Ethernet segments 214"), each providing a separate, logical layer two (L2) or layer three (L3) forwarding domain for customer networks 206A-206C ("customer networks 206"). PBB-EVPN provides customer networks 206 a bridging service for transporting frames in a "transparent" manner as if customer network 206 were directly connected via an L2 network.

PBB-EVPN combines EVPN with Provider Backbone Bridging (PBB) defined in accordance with IEEE standard 802.1ah. PBB, otherwise known as MAC-in-MAC, extends EVPN layer two (L2) switching to provide customer networks 206 a backbone network to bridge customer networks 206 by encapsulating a PBB header to customer traffic and forwarding the frames over intermediate network 212. An egress PE device, e.g., PE 210B, removes the PBB header and the original customer traffic is delivered to endpoint 204B. That is, PBB-EVPN provides MAC tunneling of customer MAC ("C-MAC") addresses for endpoints 204A–204C ("endpoints 204") learned in the data plane via normal bridging operation. Unlike with standard EVPN, PEs 210 learn C-MAC addresses for endpoints 204 on core-facing interfaces 218 in the data plane but learn B-MAC addresses in the control plane via EVPN routes.

In the example of FIG. 2, PBB-EVPN instance 203 ("EVI 203") is configured within intermediate network 212 for customer networks 206 to enable customer networks 206 to communicate with one another via PBB-EVPN as if customer networks 206 were directly connected via an L2 network. In this example, EVI 203 spans PE devices 210A, 210B participating in the EVI 203. Each of PEs 210 is configured with EVI 203 and exchanges PBB-EVPN routes to implement EVI 203.

PE 210A may locally learn a C-MAC address associated with endpoint 204A via a data plane via normal bridging operation from access-facing logical interface 217A. PE 210A may encapsulate customer traffic received from customer network 206A with a PBB header for forwarding the traffic over intermediate network 212. For example, PEs 210 include Backbone Edge Bridges 233A, 233B ("BEBs 233") associated with backbone-facing (i.e., core-facing) logical interfaces 218A, 218B ("core-facing logical interfaces 218") of PEs 210 for exchanging PBB-EVPN routes. PE 210A may operate as BEB 233A to provide an interface that encapsulates the customer traffic received from an attachment circuit (e.g., access-facing logical interface 217A, 217B) with a PBB header for forwarding over intermediate network 212.

Each of PEs 210 is associated with one or more Provider Backbone MAC ("B-MAC") addresses, which the PEs 210 distribute over the core intermediate network 212 in EVPN MAC/IP advertisement routes. PE 210A, via BEB 233A, may exchange its B-MAC address using a routing protocol (e.g., BGP) over intermediate network 212 (e.g., an MPLS core network) in MAC Advertisement routes instead of advertising C-MAC addresses via the control plane. PEs 210 then learn remote C-MAC to B-MAC bindings in the data plane for traffic received from the core. PEs 210 may build a forwarding table from remote BGP EVPN advertisements received that associate remote B-MAC addresses with corresponding remote PE 210 IP addresses and MPLS label(s). Subsequently, PE 210A, for instance, may receive, from endpoint 204A, an L2 packet having a destination MAC address that is a C-MAC and may encapsulate the L2 packet with a PBB header and MPLS header for the B-MAC bound to the C-MAC and forward the encapsulated packet to remote PE 210B that is associated with the B-MAC in PE 210A from an earlier-received EVPN MAC/IP advertisement.

Remote PE 210B may receive the encapsulated packet from intermediate network 212 and decapsulate the PBB header and MPLS header from the packet. Remote PE 210B may learn the C-MAC address for endpoint 204A in the data plane in association with the B-MAC address associated with PE 210A and included in the PBB header. In this way, PE devices 210 provide PBB bridging services as BEBs for traffic flowing between customer networks 206 and intermediate network 212.

In some examples, the PBB header may include a backbone service instance tag (I-TAG), backbone VLAN tag (B-TAG), backbone source address (B-SA), and backbone destination address (B-DA). The I-TAG includes a backbone service instance identifier (I-SID) for a service provider to identify a PBB-EVPN instance. The B-SA and B-DA indicate the backbone source and destination MAC addresses. PE 210A may advertise local B-MAC address reachability information in BGP to all other PE devices in the same EVI 203 in intermediate network 212. The other PEs 210 may learn remote C-MAC to B-MAC bindings in data-plane for traffic received from intermediate network 212 via core-facing logical interfaces 218A, 218B ("core-facing logical interfaces 218"). For example, PE 210B may receive traffic from intermediate network 212 via core-facing interface 218A and build forwarding tables associating a remote B-MAC address of PE 210A with C-MAC address of endpoint 204A and the associated MPLS label. In this way, PEs 210 may perform both local learning and remote learning of MAC addresses in PBB-EVPN. Although the example is illustrated with a single C-MAC address to B-MAC address binding, each of PEs 210 may also aggregate multiple C-MAC addresses with a single B-MAC address to provide a MAC summarization scheme.

In some examples, due to misconfiguration of any one or more of PEs 210, CEs 208; or due to duplicate L2 addresses for endpoint devices 204 behind different PEs 210; an L2 forwarding loop between PE 210B and CE 208B may occur such that PE 210B receives packets having a C-MAC address that matches the C-MAC address associated with endpoint 204A on both core-facing logical interface 218A and access-facing logical interface 217B. For instance, having already remotely learned the C-MAC address for endpoint 204A at core-facing logical interface 218A in the data plane, PE 210B may subsequently learn the C-MAC address associated with endpoint 204A on access-facing logical interface 217B. This may occur because CE 208B hairpins at least one packet having a source C-MAC address that matches the C-MAC address associated with endpoint 204A due to a routing configuration or learned route or because another L2 device, e.g., endpoint 204B of Ethernet segment 214B, is configured with a same C-MAC address associated with endpoint 204A and sends at least one packet having the source C-MAC address that is the C-MAC address. In some situations, L2 forwarding loops may occur for reasons other than those listed above.

As described above, when the same address, e.g., C-MAC associated with endpoint 204A, is learned on a different physical or logical interface of an L2 switching device such as PE device 210B, the L2 switching device performs a "MAC move." As a result of a MAC move for a MAC address from a previous interface to a new interface, the L2 switching device forwards L2 packets destined to the MAC address via the new interface. In the example of FIG. 2, due to the forwarding loop described above, the C-MAC of endpoint 204A may move from core interface 218A to access-facing logical interface 217B and back as each of these interfaces alternate, in time, receiving packets having source C-MAC addresses that match the L2 address associated with endpoint 204A.

To detect L2 forwarding loops, PE 210B may configure a loop detection threshold based on the number of times a C-MAC address move occurs over time, a specified period of time over which the C-MAC address move occurs, or a specified number of times a C-MAC address move occurs, for instance. As one example, PE 210B may be configured with a loop detection threshold that indicates a L2 forwarding loop based on detecting 5 C-MAC address moves between different interfaces of PE 210B in a span of 30 seconds. Upon reaching the loop detection threshold, PE devices 210 may in some cases block a corresponding one of access-facing logical interfaces 217 to block L2 traffic from the local customer network. In the example of FIG. 2, upon the detection of L2 forwarding loop on Ethernet segment 214B, PE 210B may block access-facing logical interface 217B from receiving L2 traffic from CE 208B. That is, PE 210B will not forward L2 traffic received on blocked access-facing logical interface 217B.

In accordance with techniques described herein, any of PE devices 210 may deterministically determine whether to block its access-facing logical interface for EVI 203 from forwarding PBB-EVPN traffic from the local customer network 206 for the PE device 210 based on a comparison of an identifier of the PE device 210 and an identifier for a remote PE device of the EVI 203. As one example, the identifiers may be B-MAC addresses of PE devices 210. For example, in response to detecting an L2 forwarding loop, PE 210B may compare a local B-MAC address of PE 210B with a remote B-MAC address of PE 210A learned on core-facing interface 218A of the EVI 203 that is logically located on the L2 forwarding path, and, based on the comparison, PE 210B may block access-facing logical interface 217B from receiving L2 traffic from customer network 206B. In some examples, if the local B-MAC address of PE 210B is lower than the remote B-MAC address of PE 210A, PE 210B may block access-facing logical interface 217A to block L2 traffic from customer network 206B. In this way, a loop between PE 210B and CE 208B is avoided. In the above examples, each of the local and remote B-MAC addresses may be associated in PE 210B with the C-MAC address for which the L2 forwarding loop is detected. For example, the local B-MAC address may be assigned to access-facing interface 217B, while PE 210B may learn the remote B-MAC address to C-MAC binding on core-facing interface 218A.

PE 210A may also detect the L2 forwarding loop detected by PE 210B and perform the operation described above to determine whether to block access-facing logical interface 217A for EVI 203. For example, PE 210B may forward L2 traffic to PE 210A of EVI 203 that is logically located on the L2 forwarding path. Having already learned the C-MAC associated with endpoint 204A at access-facing logical interface 217A, PE 210A may subsequently learn the source C-MAC address of endpoint 204A on core interface 218B. As described above, because source C-MAC address information associated with endpoint 204A appears on a different logical interface of PE 210A for EVI 203, the C-MAC address moves from access-facing logical interface 217A to core-facing logical interface 218B. PE 210A may detect an L2 forwarding loop on an L2 forwarding path, such as in intermediate network 212, based on the MAC address move from access-facing logical interface 217A to core-facing logical interface 218B. In response to detecting the L2 forwarding loop, PE 10A may compare the local B-MAC address of PE 210A with a remote B-MAC address of PE 210B learned from core-facing logical interface 218B and determine a lower B-MAC address from the local and remote PE devices. As described above, if the remote B-MAC address of PE 210B is lower than the local B-MAC address of PE 210A, then PE 210A may block access interface of PE 210B to block L2 traffic from customer network 206B.

Because PE 210A and 210B have different identifiers that serve as the basis for the determination to block an access interface for EVI 203 in response to detecting an L2 forwarding loop, and because PE 210A and 210B use each other's identifier as the remote identifier, the same operation performed by PE 210A and 210B will cause each of the PEs to determine a different result. That is, only one of PEs 210A, 210B will determine to block its associated access-facing logical interface 217 for EVI 203 (and will block the interface), and one of PEs 210A, 210B will determine not to block its associated access-facing logical interface 217 for EVI 203 (and will not block the interface). In this way, PE devices 210 may deterministically determine which access interface 217 to block in order to eliminate an L2 forwarding loop in the PBB-EVPN instance, while leaving the other access-facing logical interface 217. The respective determinations by PEs 210 may be independently performed without the PEs 210 exchanging communications to determine which of access-facing logical interfaces 217 is to be blocked.

The techniques may thus reduce overhead for customers in identifying/tracking looped logical ports and blocking logical ports to eliminate loops. In addition, by simply manipulating the identifiers for the PEs 210 in an EVI 203 on which the comparison is based, a customer may pre-determine which of access-facing logical interfaces 217 has blocking priority to facilitate customer goals for L2 traffic delivery.

Figure 3:
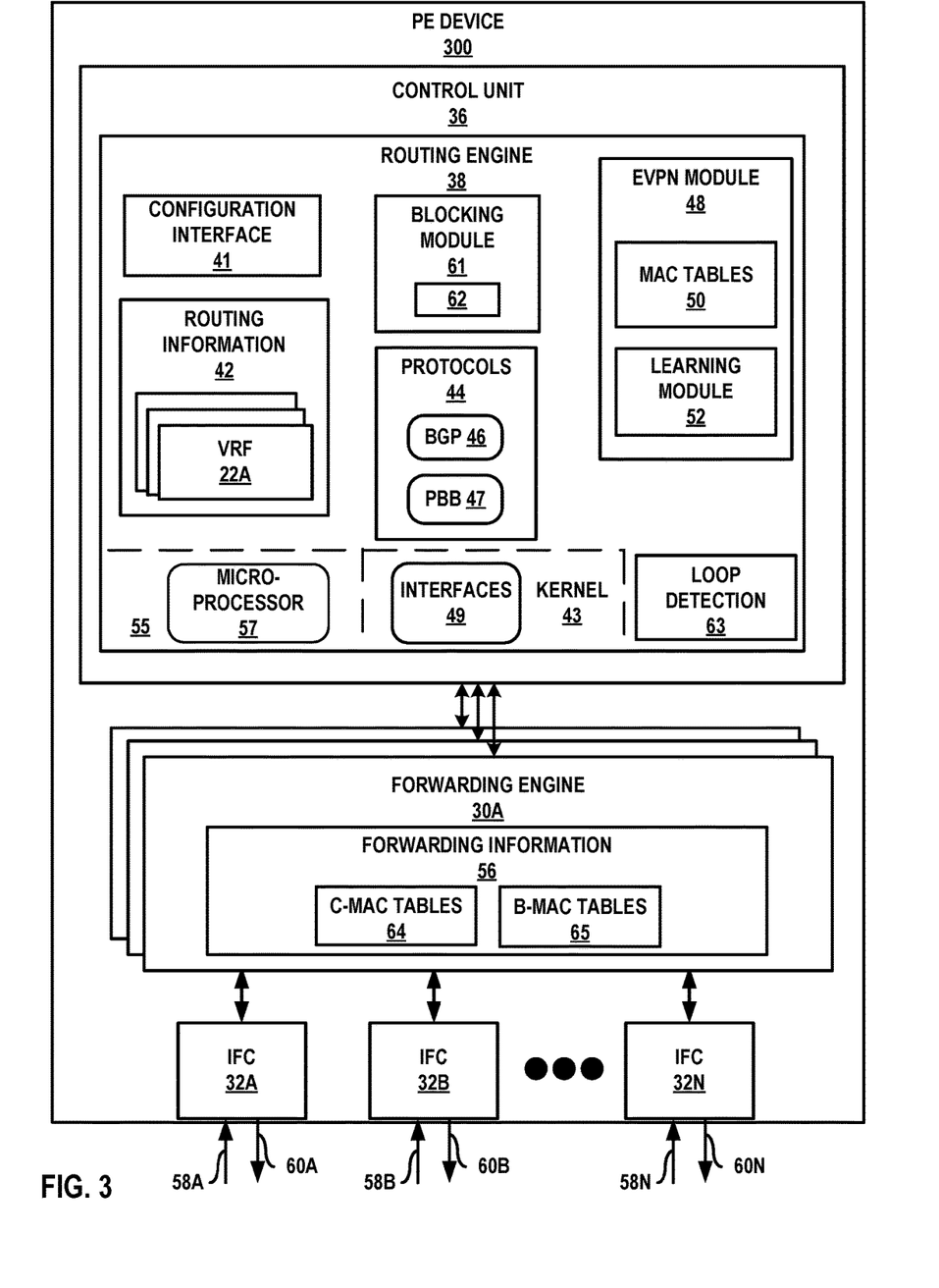
FIG. 3 is a block diagram illustrating an example provider edge network device according to techniques described herein.

FIG. 3 is a block diagram illustrating an example provider edge network device according to techniques described herein. PE device 300 is an example of any of PEs 10 and/or PEs 210 of FIGS. 1-2. PE device 300 is described with respect to PE 10B of FIG. 1, but may be performed by any PE network device. PE device 300 includes a control unit 36 having a routing engine 38, and control unit 36 is coupled to forwarding engines 30A-30N ("forwarding engines 30" or "forwarding units"). Forwarding engines 30A-30N are associated with one or more interface cards 32A-32N ("IFCs 32") that receive packets via inbound links 58A-58N ("inbound links 58") and send packets via outbound links 60A-60N ("outbound links 60"). IFCs 32 are typically coupled to links 58, 60 via a number of interface ports (not shown). Inbound links 58 and outbound links 60 may represent physical interfaces, logical interfaces, or some combination thereof. For example, any of links 58, 60 may be associated with access-facing logical interfaces (e.g., 17 and/or 217) and core-facing logical interfaces (18 and/or 218) of FIGS. 1-2.

Elements of control unit 36 and forwarding engines 30 may be implemented solely in software, or hardware, or may be implemented as combinations of software, hardware, or firmware. For example, control unit 36 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 36 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of PE device 300, e.g., protocols, processes, and modules. Control unit 36, in some examples, retrieves and executes the instructions from memory for these aspects.

Routing engine 38 includes kernel 43, which provides a run-time operating environment for user-level processes. Kernel 43 may represent, for example, a UNIX operating system derivative such as Linux or Berkeley Software Distribution (BSD). Kernel 43 offers libraries and drivers by which user-level processes may interact with the underlying system. Hardware environment 55 of routing engine 38 includes microprocessor 57 that executes program instructions loaded into a main memory (not shown in FIG. 3) from a storage device (also not shown in FIG. 3) in order to execute the software stack, including both kernel 43 and processes executing on the operating environment provided by kernel 43. Microprocessor 57 may represent one or more general or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Kernel 43 provides an operating environment that executes various protocols 44 at different layers of a network stack, including protocols for implementing EVPN and/or PBB-EVPN networks. For example, routing engine 38 includes network protocols that operate at a network layer of the network stack. In the example of FIG. 3, network protocols include the Border Gateway Protocol (BGP) 46 and/or the Provider Backbone Bridge (PBB) 47, which are routing protocols. Routing engine 38 may include other protocols not shown in FIG. 3, such as an MPLS label distribution protocol and/or other MPLS protocols. Routing engine 38 is responsible for the maintenance of routing information 42 to reflect the current topology of a network and other network entities to which PE device 300 is connected. In particular, routing protocols periodically update routing information 42 to reflect the current topology of the network and other entities based on routing protocol messages received by PE device 300.

Kernel 43 includes an interfaces table 49 that represents a data structure that includes a corresponding entry for each logical interface configured for PE device 300. For example, interface table 49 may include an entry for access-facing logical interfaces (e.g., 17 of FIG. 1) and core-facing logical interfaces (e.g., 18 of FIG. 1). Entries for respective logical interfaces may specify respective current information describing the logical interfaces.

As shown in FIG. 3, PE device 300 may be configured with multiple VRFs 22A-22N ("VRFs 22"). VRF 22A represents a virtual routing and forwarding instance. VRF 22A includes at least one routing table for BGP 46. An attachment circuit, e.g., access-facing logical interfaces 17 and core-facing logical interfaces 18 of FIG. 1, may be associated with a particular VRF, such as VRF 22A, and the particular VRF may be configured to forward traffic for the attachment circuit. As one example, access-facing logical interface 17B and core-facing logical interface 18A of PE 10B of FIG. 1 may be associated with VRF 22A and VRF 22B, respectively.

Forwarding engines 30 represent hardware and logic functions that provide high-speed forwarding of network traffic. Forwarding engines 30 typically includes a set of one or more forwarding chips programmed with forwarding information that maps network destinations with specific next hops and the corresponding output interface ports. In general, when PE device 300 receives a packet via one of inbound links 58, one of forwarding engines 30 identifies an associated next hop for the data packet by traversing the programmed forwarding information based on information within the packet. One of forwarding engines 30 (either the ingress forwarding engine or a different egress forwarding engine) forwards the packet on one of outbound links 60 mapped to the corresponding next hop. Kernel 43 may generate forwarding information 56 to include representations of information stored to VRFs 22 and interfaces 49 in the form of forwarding information for optimized forwarding by forwarding engines 30. Kernel 43 may additionally, or in the alternative, generate forwarding information 56 to include C-MAC and B-MAC bindings in the form of forwarding information for forwarding by forwarding engines 30.

In the example of FIG. 3, forwarding engine 30A includes forwarding information 56. In accordance with routing information 42, forwarding engine 30A stores forwarding information 56 that maps packet field values to network destinations with specific next hops and corresponding outbound interface ports. For example, routing engine 38 analyzes routing information 42 and generates forwarding information 56 in accordance with routing information 42. Forwarding information 56 may be maintained in the form of one or more tables, link lists, radix trees, databases, flat files, or any other data structures.

APE device 300 may be configured to implement EVPN, PBB-EVPN, or both EVPN and PBB-EVPN techniques. For a PE device 300 implementing PBB-EVPN, forwarding information 56 may include a C-MAC table 64 and a B-MAC table 65 for each PBB-EVPN instance established by PE device 300. C-MAC table 64 includes data representing mappings or associations between C-MAC addresses and B-MAC addresses. In some examples, C-MAC table 64 includes a C-MAC address as a key and a B-MAC address as the corresponding value, or vice versa. B-MAC table 65 includes data representing mappings or associations between B-MAC addresses and Ethernet segments. For instance, B-MAC table 65 includes a B-MAC address as a key that maps each B-MAC address to a corresponding remote PE device IP address and MPLS label(s) for reaching the associated Ethernet segment. As traffic is received, PE device 300 may learn C-MAC addresses for the C-MAC table 64 via data plane learning.

Forwarding engine 30A stores forwarding information 56 for each Ethernet VPN Instance and/or PBB-EVPN Instance (EVI) established by PE device 300 to associate network destinations with specific next hops and the corresponding interface ports. As described in FIG. 1, an EVI may be associated with one or more Ethernet segments in an EVPN, e.g., Ethernet segments 14A, 14B. Similarly, an EVI may be associated with one or more Ethernet segments in a PBB-EVPN, e.g., Ethernet segments 214A, 214B, of FIG. 2. In general, when PE device 300 receives a data packet from a given Ethernet segment via one of inbound links 58, forwarding engine 30A, for example, identifies an associated next hop for the data packet by traversing forwarding information 56 based on information (e.g., labeling or header information) within the packet. Forwarding engine 30A forwards the data packet on one of outbound links 60 to the corresponding next hop in accordance with forwarding information 56 associated with the Ethernet segment. At this time, forwarding engine 30A may push and/or pop labels from the packet to forward the packet along a correct LSP.

Routing engine 38 includes a configuration interface 41 that receives and may report configuration data for PE device 300. Configuration interface 41 may represent a command line interface; a graphical user interface; Simple Network Management Protocol (SNMP), Netconf, or another configuration protocol; or some combination of the above in some examples. Configuration interface 41 receives configuration data configuring the PE device 300 with VRFs 22, interfaces 49, and other constructs that at least partially define the operations for PE device 300. For example, an administrator may use configuration interface 41 to configure the identifier (e.g., loopback IP address or B-MAC address) for PE device 300.

Routing engine 38 also includes an EVPN module 48 having a learning module 52 that performs layer two (L2) learning. Learning module 52 may perform remote learning using BGP 46. EVPN module 48 may maintain MAC tables 50 for each EVI established by PE device 300, or in alternative examples may maintain one or more MAC tables 50 that are independent of each respective EVI. One of MAC tables 50, for instance, may represent a virtual routing and forwarding table of VRFs 22A for an EVI configured for VRF 22A. Learning module 52 may perform local L2/L3 (e.g., MAC/IP) binding learning by, e.g., using MAC information received by PE device 300. Learning module 52 may detect a new MAC address on an EVI access interface for an EVI and add the MAC address, with a mapping to the EVI access interface to one of the MAC tables 50 for the EVI. Learning module 52 may in addition, or in the alternative, be configured for execution, in full or in part, in the data plane to learn C-MAC addresses for a PBB-EVPN instance.

Learning module 52 may then advertise an MAC advertisement route using BGP 46 to remote PEs for the EVI. The MAC advertisement route may include a route target corresponding to the EVI, the MAC address (for EVPN) or B-MAC address (for PBB-EVPN), the Ethernet tag for the bridge domain in which the MAC address was learned, the ESI in which the MAC address was learned, the IP address corresponding to the MAC address (if known), and an EVPN label. With remote MAC learning, learning module 52 may, for EVPN, receive an MAC advertisement route from another PE device and install a host route for the IP address (if included) with protocol type EVPN for the EVI and install the MAC address in the MAC table 50 of the EVI, as well as the MAC information associated with the route in the VRF 22 including the EVPN label. For PBB-EVPN, learning module 52 may receive a MAC advertisement route from another PE device and learn the B-MAC address of another PE device.

Routing engine 38 also includes a loop detection module 63 that detects an L2 forwarding loop on an L2 forwarding path. For example, in response to learning module 52 detecting a source MAC address on an access-facing logical interface (e.g., 17B of FIG. 1) that was previously learned on a core-facing logical interface (e.g., 18A of FIG. 1) of the same EVI, loop detection module 63 detects whether an L2 forwarding loop exists on an L2 forwarding path that includes the access interface. An administrator, through the configuration interface 41, may configure for loop detection module 63 a loop detection threshold based on the number of times a MAC address move occurs over time, a specified period of time over which the MAC address move occurs, or a specified number of times a MAC address move occurs, for instance.

Similarly, learning module 52 may detect a source C-MAC address on an access-facing logical interface (e.g., 217B of FIG. 2) that was previously learned on a core-facing logical interface (e.g., 218A of FIG. 2) of the same EVI. Loop detection module 63 detects whether an L2 forwarding loop exists on an L2 forwarding path that includes the access interface. An administrator may configure a loop detection threshold based on the number of times a C-MAC address move occurs over time, a specified period of time over which the C-MAC address move occurs, or a specified number of times a C-MAC address move occurs in, for instance.

Routing engine 38 further includes a blocking module 61 having an identifier comparison module 62 for deterministically determining whether to block an access-facing logical interface of PE device 300 (e.g., interface 58A). For example, in response to reaching a loop detection threshold, loop detection module 63 may signal blocking module 61 to determine whether to block an access-facing logical interface for an EVI from forwarding L2 EVPN or PBB-EVPN traffic from the local customer network. Identifier comparison module 62 may compare identifiers, including, for example, loopback IP (e.g., IPv4/IPv6) addresses and/or B-MAC addresses, for PE device 300 and a remote PE device of the EVI. In one example, identifier comparison module 62 may compare the loopback IP address of PE device 300 and the loopback IP address of a remote PE device of the EVI that is logically located on the L2 forwarding path. In one instance, if the loopback IP address of PE device 300 is lower than the remote loopback IP address, identifier comparison module 62 may inform blocking module 61 to block interface 58 associated with the access-facing logical interface (e.g., 17B of FIG. 1). In another instance, if the loopback IP address of PE device 300 is greater than the remote loopback IP address, identifier comparison module 62 may inform blocking module 61 to not block interface 58 associated with the access-facing logical interface.

Identifier comparison module 62 may additionally, or in the alternative, compare the B-MAC address of PE device 300 and the B-MAC address of a remote PE device of the EVI that is logically located on the L2 forwarding path. In one example, if the B-MAC address of PE device 300 is lower than the remote B-MAC address, identifier comparison module 62 may inform blocking module 61 to block interface 58 associated with the access-facing logical interface (e.g., 217B of FIG. 2). In another example, if the B-MAC address of PE device 300 is greater than the remote B-MAC address, identifier comparison module 62 may inform blocking module 61 to not block interface 58 associated with the access-facing logical interface.

Figure 4:
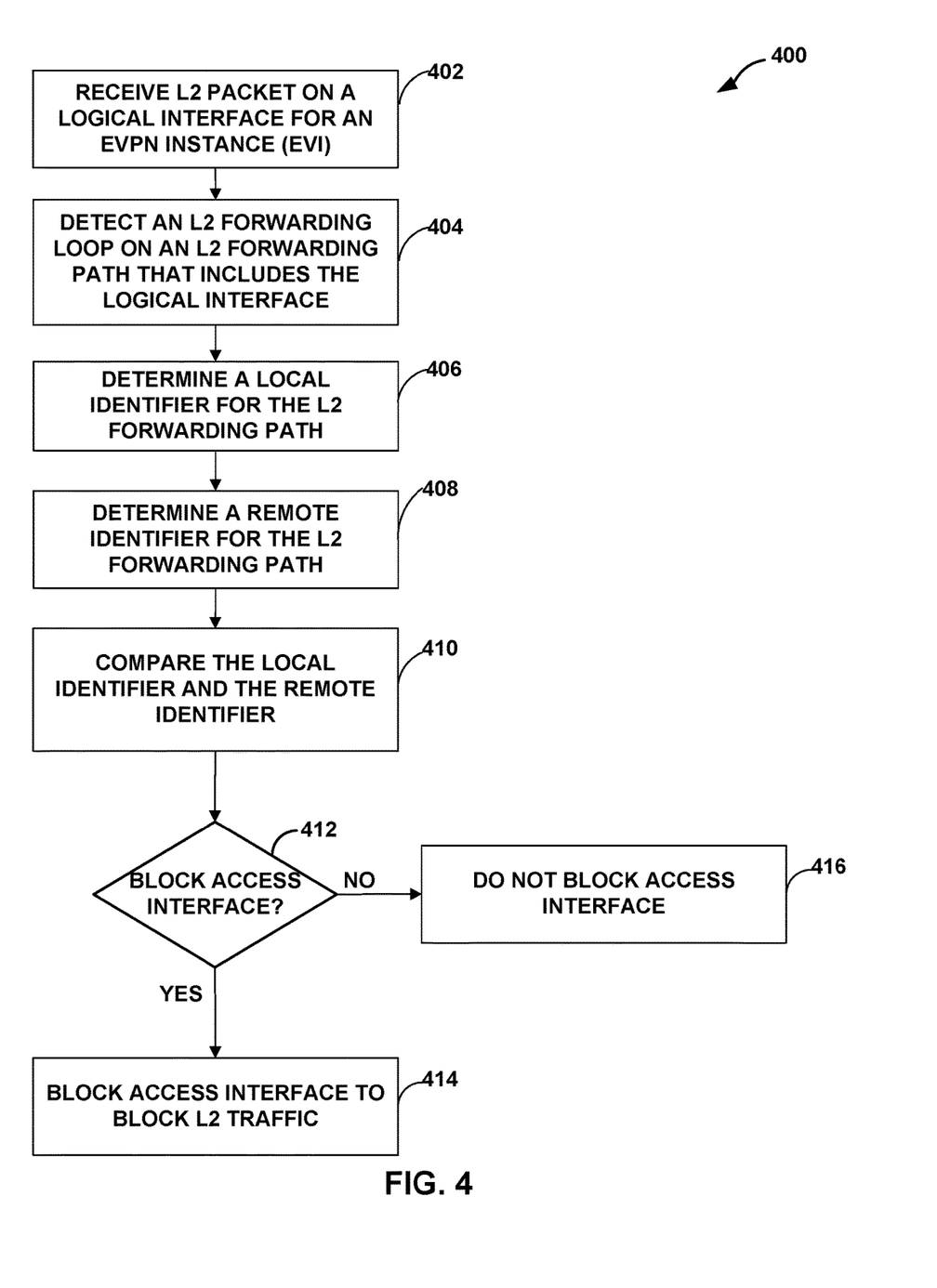
FIG. 4 is a flowchart illustrating an example operation of a provider edge network device for deterministically determining whether to block an access-facing logical interface within an EVPN instance, according to techniques described herein.

FIG. 4 is a flowchart illustrating an example operation of a provider edge network device for deterministically determining whether to block an access-facing logical interface within an EVPN instance, according to techniques described herein. Operation 400 is described with respect to PE 10B of FIG. 1, but may be performed by PE 210B of FIG. 2 or any PE network device. In some examples, due to misconfiguration of any one or more of PEs 10, CEs 8; or due to duplicate L2 addresses for endpoint devices 4 behind different PEs 10; an L2 forwarding loop between PE 10B and CE 8B may occur such that PE 10B receives an L2 packet having a source MAC addresses that match the MAC address of endpoint 4A on both core-facing logical interface 18A and access-facing logical interface 17B (402). For instance, having already remotely learned the MAC address for endpoint 4A at core-facing logical interface 18A, PE 10B may subsequently learn the MAC address for endpoint 4A on access-facing logical interface 17B.

Based in part on the received packet, PE 10B may detect an L2 forwarding loop on an L2 forwarding path of an EVI (404). For example, PE 10B may include a loop detection threshold based on the number of times a MAC address move occurs over time, a specified period of time over which the MAC address move occurs, or a specified number of times a MAC address move occurs, for instance.

In response to detecting an L2 forwarding loop, local PE device 10B may determine a local identifier for local PE device 10B (406) and an identifier of a remote PE device (408), e.g., PE 10A, that is situated on the L2 forwarding path for the MAC address for endpoint 4A. In one example, PE 10B may determine a loopback IP (IPv4/IPv6) address of PE 10B and a loopback IP address of remote PE 10A. In another example, PE 210B may determine a B-MAC address of PE 210B and a B-MAC address of a remote PE 210A. Additionally, or in the alternative, an administrator may manipulate the identifiers for the PE devices in an EVI such that a customer may pre-determine which access-facing logical interface has blocking priority to facilitate customer goals for L2 traffic delivery.

PE 10B may then compare the local identifier address (e.g., loopback IP address or B-MAC address) and the remote identifier address of PE devices of an EVI (410). The comparison may in some examples include determining a lower identifier from the identifier for the local PE device and the identifier for the remote PE device. In other examples, the comparison may include determining a higher identifier from the identifier for the local PE device and the identifier for the remote PE device. In any case, based on the result of the comparison, PE 10B determines whether to block its access-facing interface 17A for EVI 3 (412).

If PE 10B determines to block access-facing interface 17A (YES branch of 412), PE 10B blocks access-facing interface 17A (414). If PE 10B determines not to block access-facing interface 17A (NO branch of 412), PE 10B does not block access-facing logical interface 17A (416). In some examples, a determination that the local PE device has a lower identifier blocks the access-facing logical interface 17A. A determination that the local PE device has a higher identifier does not block the access-facing logical interface 17A.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various aspects of the techniques have been described. These and other aspects are within the scope of the following claims.

What is claimed is:
1. A method comprising:
   detecting, by a local provider edge (PE) device that implements an Ethernet Virtual Private Network (EVPN) instance to provide layer 2 (L2) bridge connectivity for a local customer network using an access-facing logical interface connected to the local customer network, an L2 forwarding loop on an L2 forwarding path that includes the access-facing logical interface connected to the local customer network, wherein detecting the L2 forwarding loop comprises detecting, by the local PE device, a media access control (MAC) address move; and
   blocking, by the local PE device in response to the detecting of the L2 forwarding loop and based at least on comparing an identifier for the local PE device and an identifier for a remote PE device for a remote customer network, the access-facing logical interface connected to the local customer network to block L2 traffic from the local customer network, wherein the remote PE device implements the EVPN instance and is logically located on the L2 forwarding path.
2. The method of claim 1,
   wherein the identifier for the local PE device comprises a loopback Internet Protocol address configured for the local PE device, and
   wherein the identifier for the remote PE device comprises a loopback Internet Protocol address configured for the remote PE device.
3. The method of claim 1,
   wherein the identifier for the remote PE device is associated with a core-facing logical interface of the local PE device for the EVPN instance, and
   wherein L2 forwarding path includes the core-facing logical interface of the local PE device.
4. The method of claim 1,
   wherein comparing the identifier for the local PE device and the identifier for the remote PE device comprises determining a lower identifier from the identifier for the local PE device and the identifier for the remote PE device, wherein blocking the access-facing logical interface connected to the local customer network comprises blocking, by the local PE device, the access-facing logical interface connected to the local customer network in response to determining the identifier for the local PE device is the lower identifier.

5. The method of claim 1, wherein the access-facing logical interface connected to the local customer network is an attachment circuit associated with a virtual routing and forwarding (VRF) of the local PE device.

6. The method of claim 1, wherein the EVPN instance comprises a Provider Backbone Bridging (PBB)-EVPN instance.

7. The method of claim 6,
wherein the identifier for the local PE device comprises a backbone MAC (B-MAC) address configured for the local PE device, and
wherein the identifier for the remote PE device comprises a B-MAC address configured for the remote PE device.

8. The method of claim 1, wherein the L2 forwarding loop includes the local PE device, the remote PE device, and the remote customer network.

9. The method of claim 1, wherein the L2 forwarding loop includes the local PE device and the local customer network.

10. The method of claim 1, further comprising:
configuring the identifier for the local PE device and the identifier for the remote PE device to pre-determine blocking priority of the access-facing logical interface of the local PE device connected to the local customer network over an access-facing logical interface for the remote PE device connected to the remote customer network.

11. A network device comprising:
one or more processors operably coupled to a memory,
wherein the one or more processors are configured to implement an Ethernet Virtual Private Network (EVPN) instance to provide layer 2 (L2) bridge connectivity for a local customer network using an access-facing logical interface connected to the local customer network,
wherein the one or more processors are configured to detect an L2 forwarding loop on an L2 forwarding path that includes the access-facing logical interface connected to the local customer network, wherein to detect the L2 forwarding loop the one or more processors are configured to detect a media access control (MAC) address move; and
wherein the one or more processors are configured to block, based at least on comparing an identifier for the network device and an identifier for a remote network device for a remote customer network, the access-facing logical interface connected to the local customer network to block L2 traffic from the local customer network, wherein the remote network device implements the EVPN instance and is logically located on the L2 forwarding path.

12. The network device of claim 11, wherein, to compare the identifier for the network device and the identifier for the remote network device, the one or more processors are further configured to compare the loopback Internet Protocol address configured for the network device and a loopback Internet Protocol address configured for the remote network device.

13. The network device of claim 11, wherein, to compare the identifier for the network device and the identifier for the remote network device, one or more processors are further configured to compare a backbone MAC (B-MAC) address configured for the network device and a B-MAC address configured for the remote network device.

14. The network device of claim 11,
wherein, to compare the identifier for the network device and the identifier for the remote network device, the one or more processors are further configured to determine a lower identifier from the identifier for the network device and the identifier for the remote network device,
wherein, to block the access-facing logical interface connected to the local customer network to block L2 traffic from the local customer network, the one or more processors are further configured to block the access-facing logical interface connected to the local customer network in response to determining the identifier for the network device is the lower identifier.

15. The network device of claim 11, wherein the access-facing logical interface connected to the local customer network is an attachment circuit associated with a virtual routing and forwarding (VRF) of the network device.

16. The network device of claim 11, wherein the EVPN instance comprises a Provider Backbone Bridging (PBB)-EVPN instance.

17. A system comprising:
a local provider edge (PE) device of an intermediate layer 3 network, the local PE device configured to implement an Ethernet Virtual Private Network (EVPN) instance that is configured on the local PE device to provide layer 2 (L2) bridge connectivity to a local customer network via an access-facing logical interface of the local PE device connected to the local customer network;
a remote PE device of the intermediate layer 3 network, the remote PE device configured to implement the EVPN instance that is configured on the remote PE device to provide layer 2 (L2) bridge connectivity for a remote customer network via an access-facing interface of the remote PE device connected to the remote customer network,
wherein the local PE device is configured to detect an L2 forwarding loop on an L2 forwarding path that includes the access-facing interface of the local PE device connected to the local customer network and to block, in response to the detection and based at least on comparing an identifier for the local PE device and an identifier for the remote PE device, the access-facing interface of the local PE device connected to the local customer network to block L2 traffic from the local customer network, wherein to detect the L2 forwarding loop the local PE device is configured to detect a media access control (MAC) address move, and
wherein the remote PE device is configured to detect the L2 forwarding loop and to not block, in response to the detection and based at least on comparing the identifier for the local PE device and the identifier for the remote PE device, the access-facing interface of the remote PE device connected to the remote customer network to continue forwarding L2 traffic from the remote customer network.

* * * * *